United States Patent
Kang

(10) Patent No.: US 10,328,989 B2
(45) Date of Patent: Jun. 25, 2019

(54) HORSE-RIDING BICYCLE

(71) Applicant: In Tae Kang, Incheon (KR)

(72) Inventor: In Tae Kang, Incheon (KR)

(*) Notice: Subject to any disclaimer, the term of this patent is extended or adjusted under 35 U.S.C. 154(b) by 0 days.

(21) Appl. No.: 15/982,260

(22) Filed: May 17, 2018

(65) Prior Publication Data

US 2018/0265162 A1 Sep. 20, 2018

Related U.S. Application Data

(63) Continuation of application No. 15/069,859, filed on Mar. 14, 2016, now Pat. No. 9,975,596.

(30) Foreign Application Priority Data

Mar. 18, 2015 (KR) .................. 10-2015-0037617

(51) Int. Cl.
| | | |
|---|---|---|
| *B62K 13/00* | (2006.01) | |
| *B62K 23/02* | (2006.01) | |
| *A63G 19/04* | (2006.01) | |
| *B62M 9/08* | (2006.01) | |
| *B62K 23/04* | (2006.01) | |
| *B62K 25/02* | (2006.01) | |

(52) U.S. Cl.
CPC .............. *B62K 13/00* (2013.01); *A63G 19/04* (2013.01); *B62K 23/02* (2013.01); *B62K 23/04* (2013.01); *B62K 25/02* (2013.01); *B62M 9/085* (2013.01); *B62K 2208/00* (2013.01)

(58) Field of Classification Search
CPC .......... B60B 2900/911; B60B 2340/10; B62K 13/00; B62K 3/02; B62K 23/12; B62K 25/02; B62M 9/08; B62M 1/00; A63G 19/04

See application file for complete search history.

(56) References Cited

U.S. PATENT DOCUMENTS

| | | | |
|---|---|---|---|
| 605,182 A * | 6/1898 | Johntson | ............... B62K 25/02 280/229 |
| 985,369 A * | 2/1911 | Robbins | ................. B62K 25/02 280/229 |
| 3,817,120 A | 6/1974 | Clay | |
| 4,588,232 A | 5/1986 | Kim et al. | |
| 4,889,354 A | 12/1989 | Wen | |
| 4,917,394 A | 4/1990 | Lin | |
| 5,002,295 A | 3/1991 | Lin | |

(Continued)

FOREIGN PATENT DOCUMENTS

| | | | | |
|---|---|---|---|---|
| EP | 0155808 A2 * | 9/1985 | ............. | B62K 25/02 |
| EP | 0436749 A1 * | 7/1991 | ........... | B60B 27/023 |

(Continued)

*Primary Examiner* — Joseph M Rocca
*Assistant Examiner* — Daniel S Yeagley
(74) *Attorney, Agent, or Firm* — IP Legal Services, LLC

(57) ABSTRACT

Provided is a horse-riding bicycle in which a horse-riding effect is obtained by performing both normal driving and horse-riding driving (swinging driving), a user is allowed to simply switch a driving mode between a normal driving mode and a horse-riding driving mode, and a horse-riding driving structure is improved to have a simple structure so that a reduction in costs is achieved and, further, a switching operation between the normal driving mode and the horse-riding driving mode is smoothly performed.

2 Claims, 25 Drawing Sheets

(56) References Cited

U.S. PATENT DOCUMENTS

| | | | |
|---|---|---|---|
| 5,249,847 A | 10/1993 | Lee | |
| 6,186,918 B1 | 2/2001 | Yoo | |
| 6,371,571 B1 | 4/2002 | Tsan | |
| 9,944,117 B2 * | 4/2018 | Oliveira | B60B 19/00 |
| 2005/0173880 A1 | 8/2005 | Knox et al. | |
| 2006/0012143 A1 * | 1/2006 | Gu | B60G 3/01 |
| | | | 280/124.125 |
| 2011/0140383 A1 * | 6/2011 | Brandeau | B60B 19/00 |
| | | | 280/80.1 |

FOREIGN PATENT DOCUMENTS

| | | |
|---|---|---|
| KR | 10-0823148 B1 | 4/2008 |
| KR | 10-0998939 B1 | 12/2010 |

* cited by examiner

HORSE-RIDING BICYCLE

CROSS-REFERENCE(S) TO RELATED APPLICATION

This application is continuation application of U.S. patent application Ser. No. 15/069,859 (filed on Mar. 14, 2016), which claims priority under 35 U.S.C. § 119 to Korean Patent Application No. 10-2015-0037617 (filed on Mar. 18, 2015).

BACKGROUND OF THE INVENTION

Field of the Invention

The present invention relates to a horse-riding bicycle in which a horse-riding effect can be obtained by performing both normal driving and horse-riding driving (swinging driving), a user can simply switch a driving mode between a normal driving mode and a horse-riding driving mode, and a horse-riding driving structure is improved to have a simple structure so that a reduction in costs can be achieved and, further, a switching operation between the normal driving mode and the horse-riding driving mode is smoothly performed.

Description of the Related Art

Generally, horse-riding bicycles having various structures have been applied. Korean Patent Application No. 10-2010-0071166, as an example of the applications, discloses a driving-mode-switching-type horse-riding bicycle having a configuration in which a driving-mode-switching guide member as one of devices for switching driving modes is operated further smoothly.

However, the driving-mode-switching-type horse-riding bicycle disclosed in Korean Patent Application No. 10-2010-0071166 has a problem in that the structures of a driving-mode-switching main body, a driving-mode-switching guide member, and a pulling device are extremely complicated, resulting in an increase in costs. In addition, there is a problem in that due to the extremely complicated structures, a switching operation between the normal driving mode and the horse-riding driving mode is not performed smoothly.

PRIOR ART DOCUMENT(S)

Patent Document (Patent Document 0001) Patent Document: Patent Application No. 10-2010-0071166 (Jul. 23, 2010)

SUMMARY OF THE INVENTION

An object of the present invention is to provide a horse-riding bicycle in which both normal driving and horse-riding driving can be performed, and thus, a horse-riding effect can be obtained.

Another object of the present invention is to provide a horse-riding bicycle in which normal driving mode and horse-riding driving mode can be simply switched, and thus, convenience of a user and marketability of a product can be improved.

Another object of the present invention is to provide a horse-riding bicycle in which a horse-riding driving structure is improved to have a simple structure so that a reduction in costs can be achieved and, further, a switching operation between a normal driving mode and a horse-riding driving mode can be performed smoothly.

In order to achieve these objects described above, there is provided a horse-riding bicycle in which guide holes and roller holes are respectively formed in a pair of hubs which are installed in each of front and rear wheels of a bicycle, connection plates which are connected to both sides of the roller hole and in which shaft holes are formed are connected, a pair of support plates of which one sides are connected by a connection plate so as to support a hub shaft connected to a fork are movably assembled inside the guide hole of the hub, guide plates which guide movement of the hub are respectively attached to inner upper and lower portions of the hub. a screw rod which is disposed in center portions of the shaft holes is fixed to the connection plate of the support plate, a movement roller is installed in the shaft holes such that both ends are rotatable in a state where the movement roller is thread-joined to the screw rod and an outer surface protrudes outside through the roller hole and moves the hub to a position of a normal driving mode or a horse-riding driving mode by rotating in a normal direction or a reverse direction, left and right fixing rings which include pads of which inner surfaces are come into contact with the movement roller are disposed in an outer side of the hub, left and right operation members which cause the left and right fixing rings to come into close contact with the movement roller selectively are installed in the fork, and a pair of switching members which respectively pull or release the left and right operation members through wires are installed in handles on both sides of the bicycle.

According to embodiments of the present invention, both normal driving and horse-riding driving can be performed by moving the hub to a position concentric or eccentric with respect to the hub shaft. As a result, a swinging movement similar to horse riding is achieved in cycling, and thus it is possible to provide a further exciting feeling and a total-body workout in simple cycling. In addition, a user can simply switch a driving mode between the normal driving mode and the horse-riding driving mode, and thus convenience of a user and marketability of a product can be improved. Furthermore, the structure of the horse-riding driving mode in which the hub is simple, and thus a reduction in costs can be achieved and, further, a switching operation between the normal driving mode and the horse-riding driving mode can be performed smoothly.

BRIEF DESCRIPTION OF THE DRAWINGS

FIGS. 1 to 12 illustrate a first embodiment of the present invention.

FIG. 1 is a side view illustrating a whole structure of the first embodiment of the present invention.

FIG. 2 is a perspective view illustrating an assembled state of a hub and a support plate according to the first embodiment of the present invention.

FIGS. 3 and 4 are exploded perspective views illustrating a principal portion of the first embodiment of the present invention.

FIG. 5 is an exploded perspective view of a movement roller according to the first embodiment of the present invention.

FIG. 6 is a plane cross-sectional view illustrating an assembled state of the hub and the support plate according to the first embodiment of the present invention.

FIG. 7 is an exploded perspective view illustrating an operation state of left and right operation members according to the first embodiment of the present invention.

FIG. 8 is a cross-sectional view illustrating an assembled state of members illustrated in FIG. 7.

FIG. 11 is an enlarged view of a part A of FIG. 1.

FIG. 12 is an exemplary view of a switching member according to the first embodiment of the present invention.

FIGS. 13 to 22 illustrate a second embodiment of the present invention.

FIG. 13 is a side view illustrating a whole structure of the second embodiment of the present invention.

FIG. 14 is a perspective view illustrating an assembled state of a hub and a support plate according to the second embodiment of the present invention.

FIGS. 15 and 16 are exploded perspective views illustrating a principal portion of the second embodiment of the present invention.

FIG. 17 is a lateral cross-sectional view illustrating an assembled state of the hub and the support plate according to the second embodiment of the present invention.

FIG. 18 is a plane cross-sectional view illustrating an assembled state of the hub and the support plate according to the second embodiment of the present invention.

FIG. 22 is an exemplary view of a switching member according to the second embodiment of the present invention.

DETAILED DESCRIPTION OF EMBODIMENTS

Figure 1:
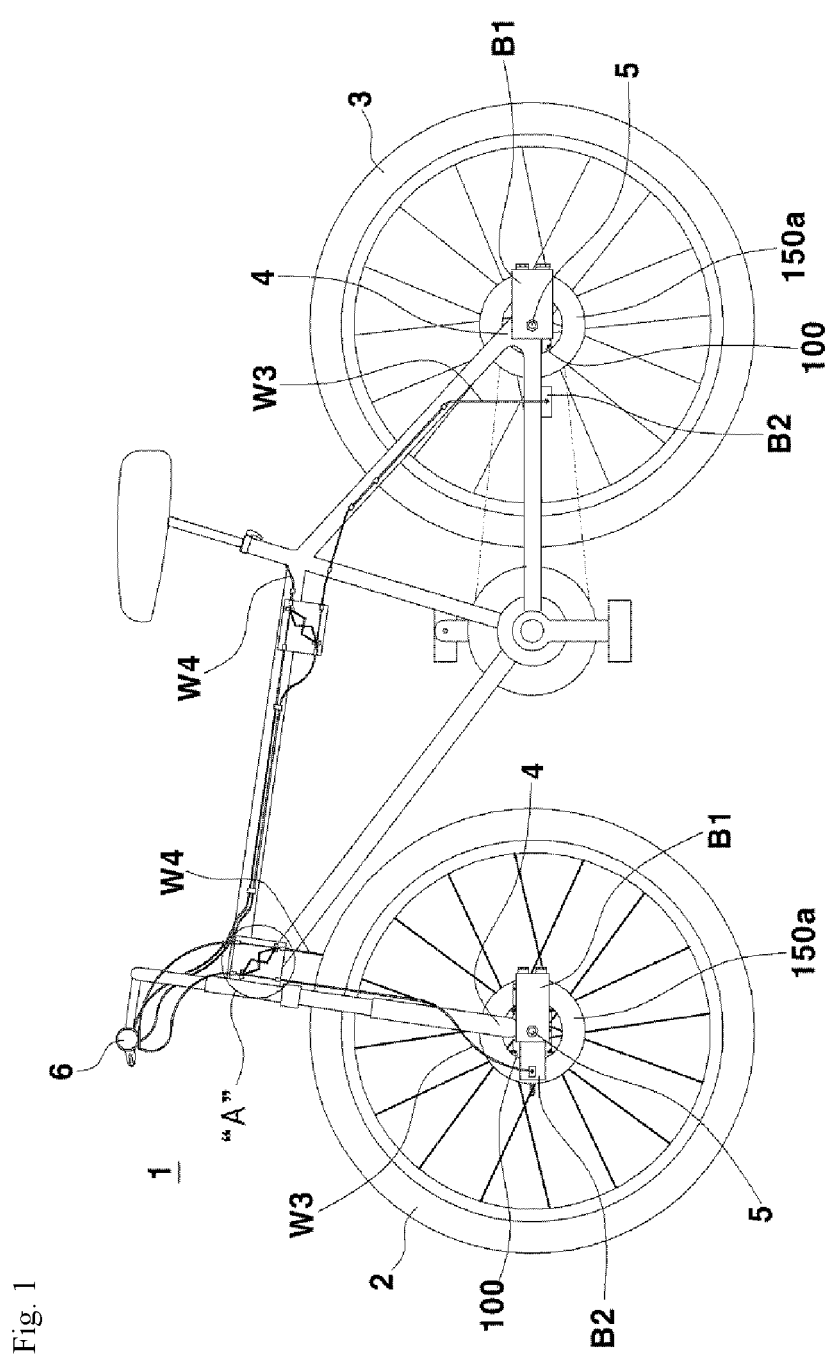

The basic feature of a technical configuration of a horse-riding bicycle according to a first embodiment of the present invention is as follows. As illustrated in FIGS. 1 to 12, the horse-riding bicycle according to the first embodiment of the present invention includes: a pair of hubs 100 which are installed in each of front and rear wheels 2 and 3 of a bicycle 1, the pair of hubs 100 including guide holes 101 and roller holes 102 and first and second connection plates 103 and 104 which are connected to both sides of the roller hole 102 and in which shaft holes 103a and 104a are formed; a pair of support plates 110 which are movably assembled inside the guide hole 101 of the hub 100 and of which one sides are connected by a connection plate 111 so as to support a hub shaft 5 connected to a fork 4; guide plates 120 which are respectively attached to inner upper and lower portions of the hub 100 and guide movement of the hub 100; a screw rod 130 which is fixed to the connection plate 111 of the support plate 110 and disposed in center portions of the shaft holes 103a and 104a; a movement roller 140 which is installed in the shaft holes 103a and 104a such that both ends are rotatable in a state where the movement roller 140 is thread-joined to the screw rod 130 and an outer surface protrudes outside through the roller hole 102 and moves the hub 100 to a position of a normal driving mode or a horse-riding driving mode by rotating in a normal direction or a reverse direction; left and right fixing rings 150a and 150b which are disposed in an outer side of the hub 100 and include pads 151a and 151b of which inner surfaces are come into contact with the movement roller 140; left and right operation members 160a and 160b which are installed in the fork 4 and cause the left and right fixing rings 150a and 150b to come into close contact with the movement roller 140 selectively; and a pair of switching members 170 which are installed in handles 6 on both sides of the bicycle 1 and respectively pull or release the left and right operation members 160a and 160b through wires W3 and W4.

Figure 2:
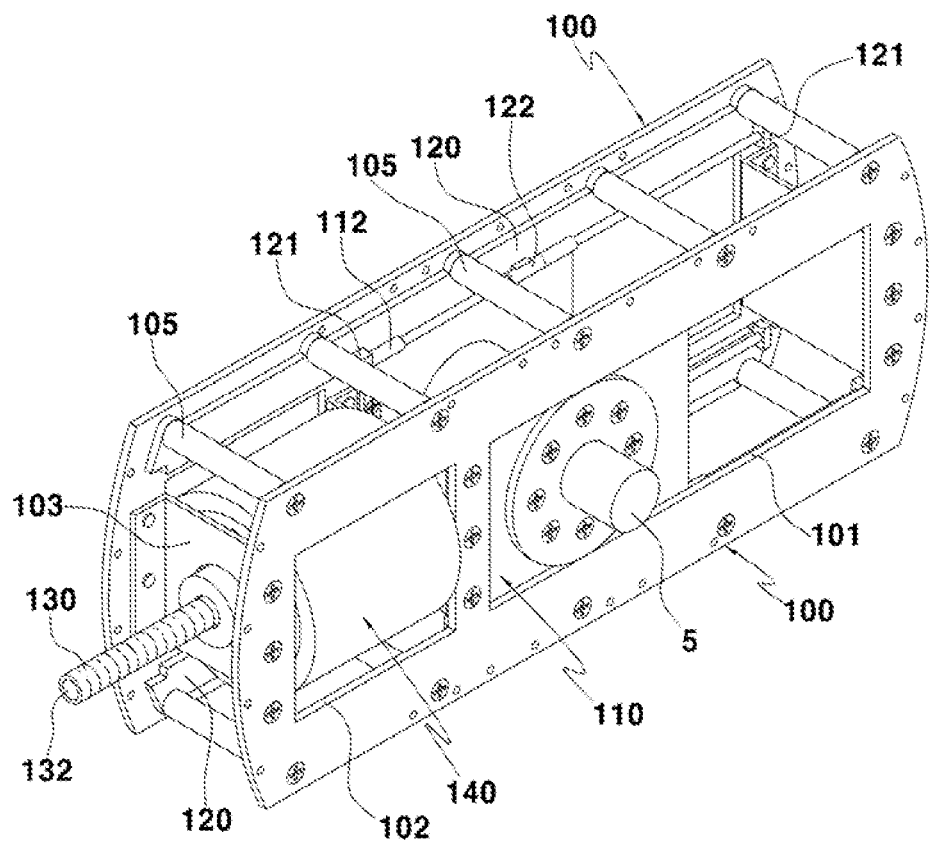

In this case, the hubs 100 are formed to have a rectangular shape. The hubs 100 are installed on both sides of center portions of the front wheel 2 and the rear wheel 3 of the bicycle 1. The guide holes 101 and the roller holes 102 each having a rectangular shape are respectively formed in the pair of both hubs 100. In addition, the first connection plate 103 and the second connection plate 104 in which the shaft holes 103a and 104a are formed are connected to both sides of the roller holes 102 of the pair of both hubs 100. In this case, a plurality of spacing rods (105) are connected to both the hubs 100 and the guide plates 120 by fastening screws or the likes, as illustrated in FIG. 2.

The support plate 110 is formed to have a rectangular shape and is movably assembled inside the guide holes 101 of both the hubs 100 which are disposed in the front and rear wheels 2 and 3. The pair of both support plates 110 rotatably support front and rear hub shafts 5 which are connected to the front and rear forks 4. The connection plate 111 is connected to one sides of the pair of both support plates 110.

The guide plates 120 are respectively attached to the inner upper and lower portions of the hub 100. Both the guide plates 120 in the upper and lower portions guide the movement of the hub 100.

Figure 3:
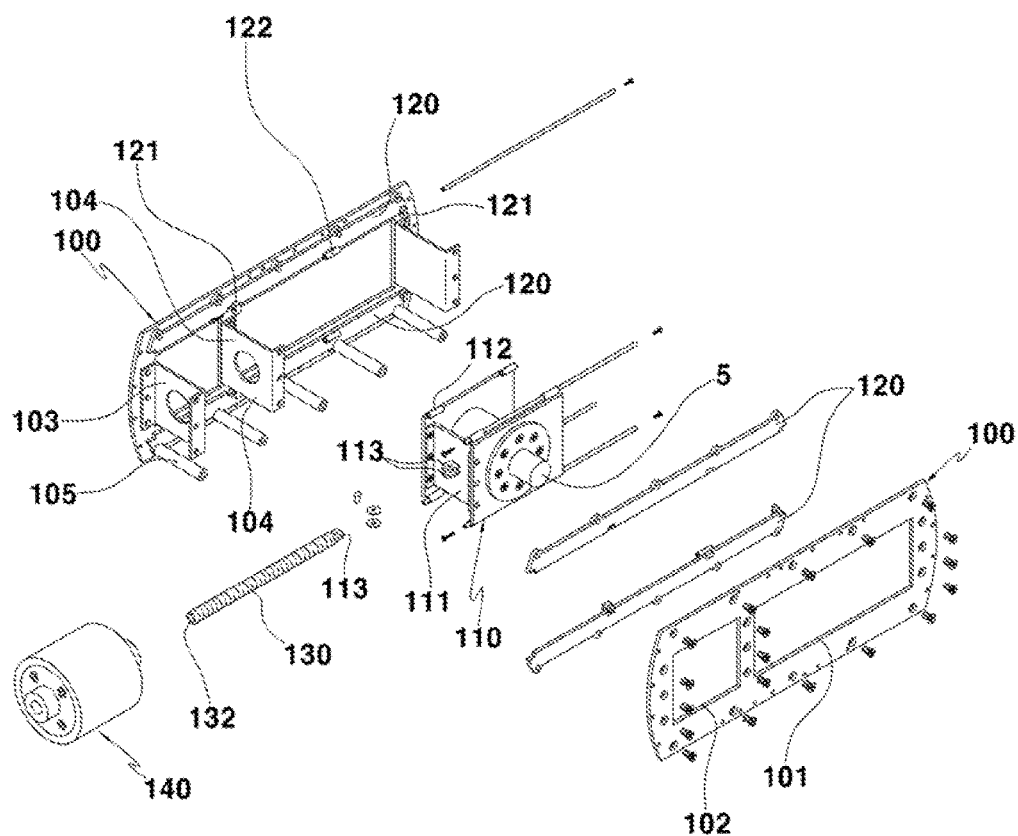
Figure 4:
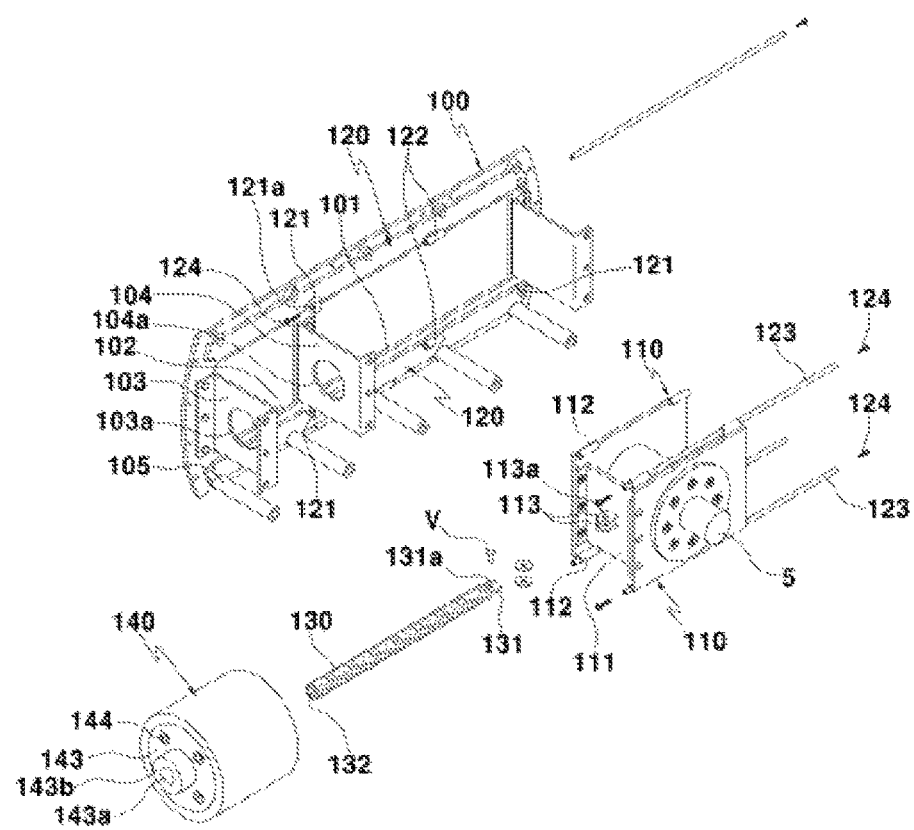

According to the present invention, two fixing pieces 121 in which screw holes 121a are formed are attached to each of the guide plates (120) on both sides of the guide hole 101, as illustrated in FIGS. 3 and 4. Furthermore, in a center portion between both the fixing pieces 121, a movement tube 122 is attached to the guide plate 120. Both ends of a guide rod 123 are fixed to screw holes 121a of both the fixing pieces 121 by fastening a screw 124, in a state where the guide rod 123 is inserted into the movement tube 122. In addition, support tubes 112 into which the guide rods 123 are inserted and which movably support the guide rods 123 are attached to upper and lower portions on one side of the support plate 110.

One end of the screw rod 130 is integrally fixed to the connection plate 111 of the support plate 110. The screw rod 130 is disposed to extend over center portions of the shaft holes 103a and 104a of the first connection plate 103 and the second connection plate 104.

According to the present invention, a pair of fixing pieces 113 in which rivet holes 113a are formed are attached to the connection plate 111, as illustrated in FIG. 4. Furthermore, a fixing portion 131 which has a rivet hole 131a is formed in one end of the screw rod 130. The fixing portion 131 is interposed between the pair of fixing pieces 113 and fixed by a rivet V. A hollow portion 132 is formed in an inner portion of the screw rod 130 to reduce the weight.

The movement roller 140 is installed in the shaft holes 103a and 104a such that both ends of the movement roller 140 are rotatable in a state where the movement roller 140 is thread-joined to the screw rod 130 and protrudes outside through the roller hole 102. The movement roller 140 moves the hub 100 to a position of a normal driving mode or a horse-riding driving mode by rotating in a normal direction or a reverse direction.

Figure 5:
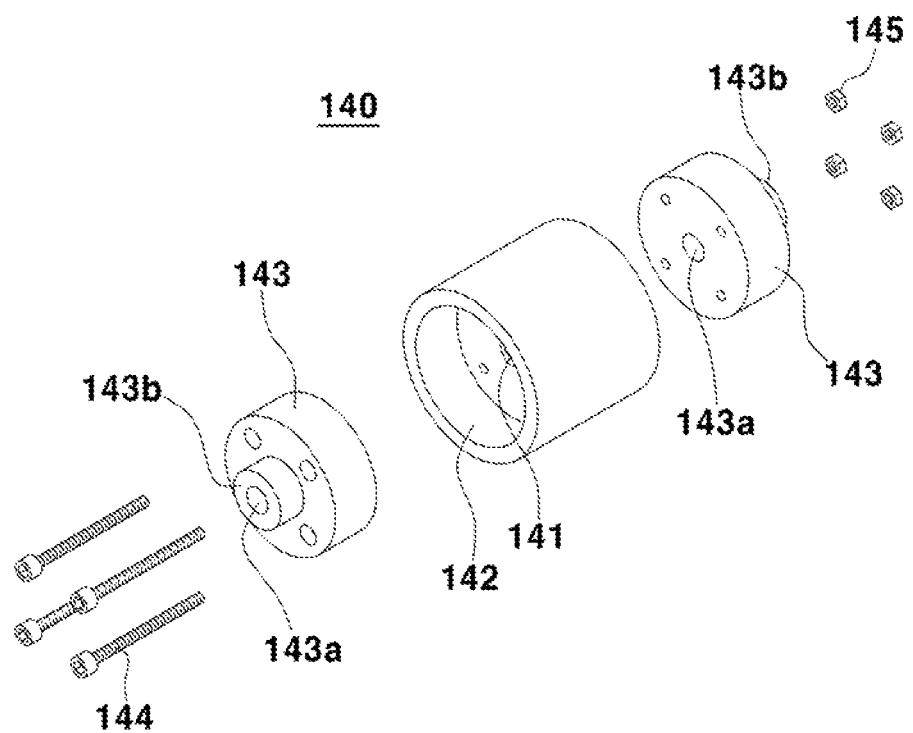
Figure 6:
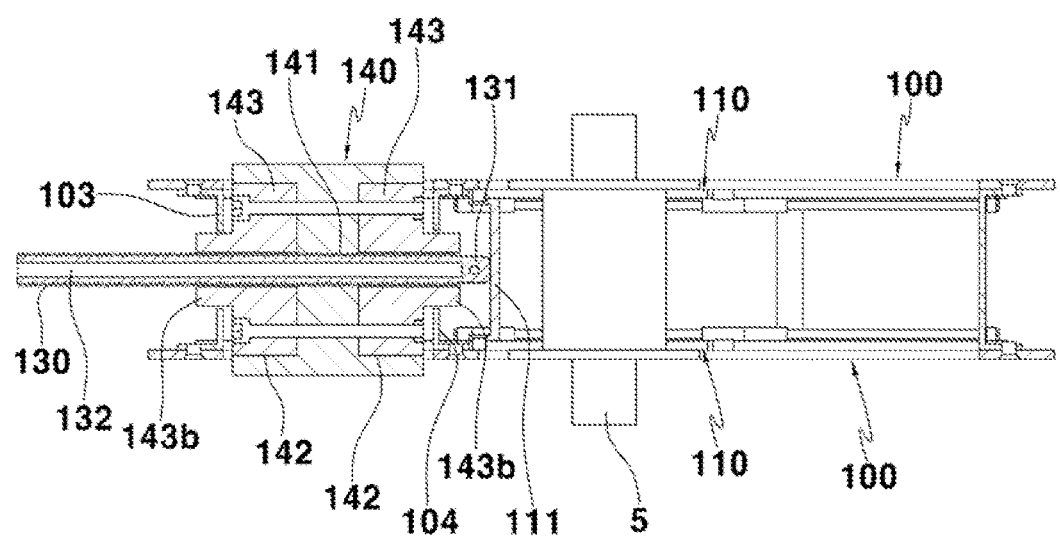
Figure 7:
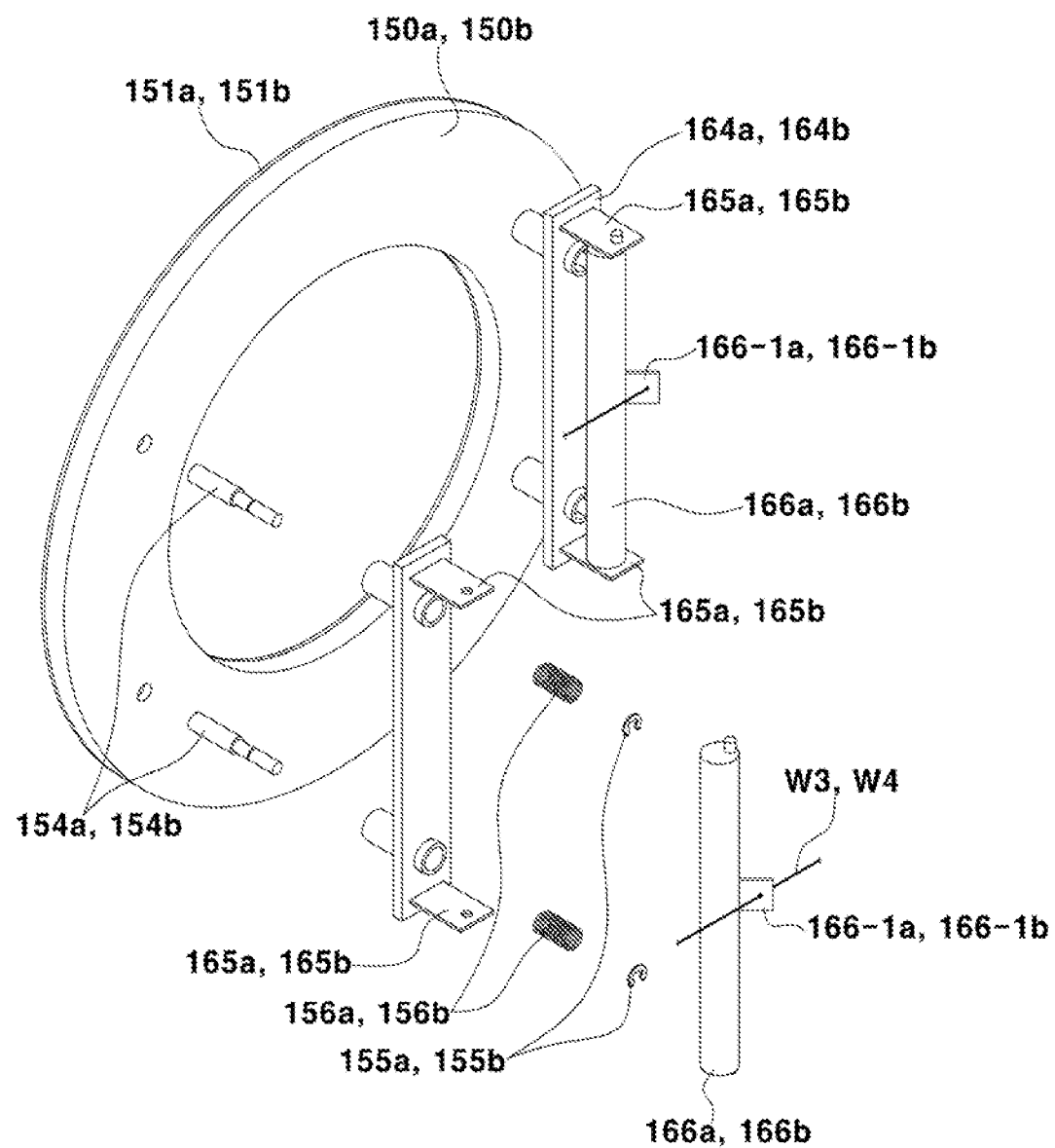
Figure 8:
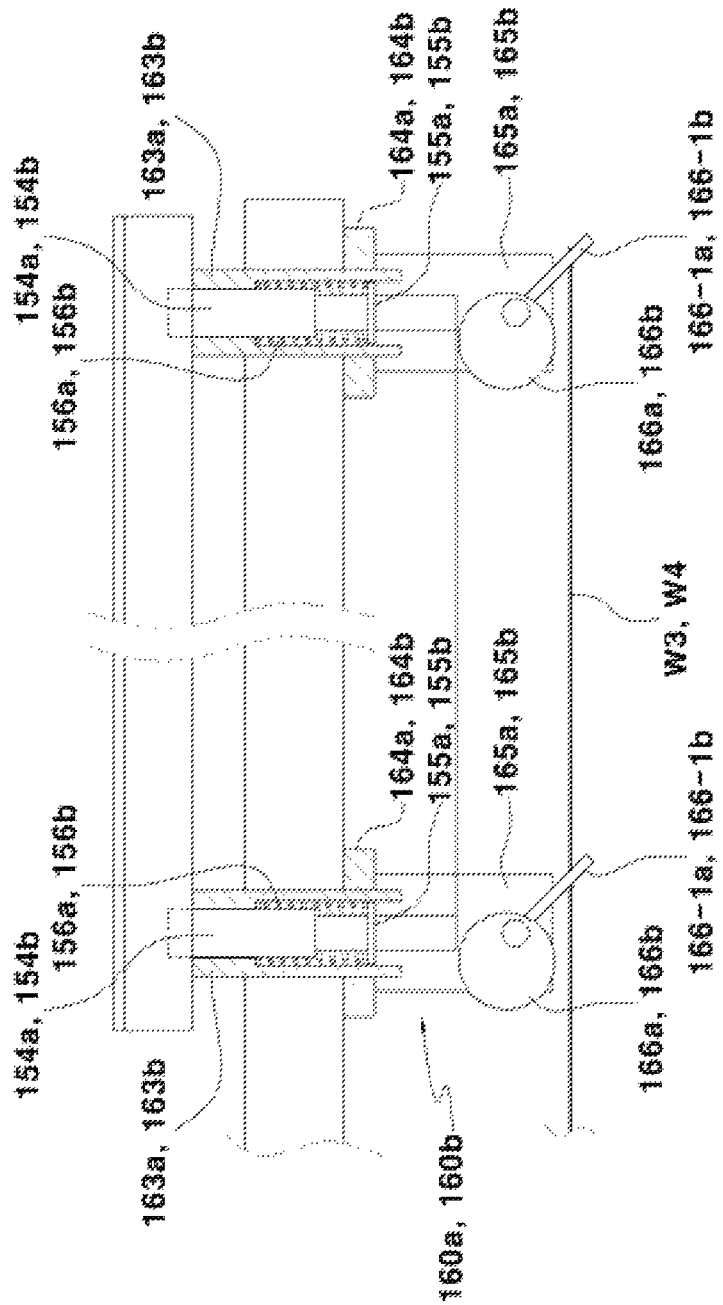

According to the present invention, a female screw 141 to which the screw rod 130 is thread-joined is formed in a center portion in an inner portion of the movement roller 140, as illustrated in FIGS. 5 and 6. In addition, insertion holes 142 are respectively formed on both sides of the movement roller 140. Rotation portions 143 in which screw holes 143a pass through center portions of inner portions are respectively inserted into the insertion holes 142 and fixed by fastening a plurality of bolts 144 and nuts 145. In the rotation portions 143, shafts 143b which are respectively inserted into the shaft holes 103a and 104a are formed.

The movement roller 140 is rotatably installed in the first and second connection plates 103 and 104 of the hub 100. When a rotation force is applied to the movement roller 140 in a normal direction or a reverse direction, the guide hole 101 of the hub 100 smoothly moves along the support plate 110 toward an inner side or an outer side by tightening or releasing of the movement roller 140 which is thread-joined to the screw rod 130. As a result, the hub 100 can maintain a concentric state or an eccentric state in relation to the hub shaft 5. In this case, the screw rod 130 maintains a fixed state in relation to the support plate 110 and the movement roller 140 is rotatably installed in the hub 100 and assembled by being screwed with the screw rod 130, and thus, when the movement roller 140 is rotated in the normal direction or the reverse direction, the movement roller 140 moves in a direction directed to the hub shaft 5 or an opposite direction by the screw rod 130. As a result, the hub 100 moves along with the movement roller 140.

The left and right fixing rings 150a and 150b are respectively disposed on outer sides of the hubs 100. The pads 151a and 151b which come into contact with the movement roller 140 are respectively attached to inner surfaces of the left and right fixing rings 150a and 150b. In this case, the left and right fixing rings 150a and 150b cause the movement roller 140 to rotate in the normal direction or the reverse direction. In other words, the left fixing ring 150a is used to move the hub 100 in an eccentric direction during horse-riding driving and the right fixing ring 150b is used to move the hub 100 in a center direction during normal driving.

The left and right operation members 160a and 160b are installed in the fork 4. The left and right operation members 160a and 160b cause the left and right fixing rings 150a and 150b to come into close contact with the movement roller 140 selectively. In this case, the left operation member 160a is used to move the hub 100 in the eccentric direction during horse-riding driving and the right operation member 160b is used to move the hub 100 in the center direction during normal driving.

According to the present invention, operation rods 154a and 154b are fixed to both upper portions and lower portions of the left and right fixing rings 150a and 150b, as illustrated in FIGS. 7, 9a, 9b, and 9c. Furthermore, the left and right operation members 160a and 160b are constituted of a pair of fixing plates 164a and 164b which are fixed to the fork 4 and include support tubes 163a and 163b to which the operation rods 154a and 154b are respectively inserted. The operation rods 154a and 154b are inserted into the support tubes 163a and 163b in a state where the operation rods 154a and 154b receive elasticity from springs 156a and 156b supported by snap rings 155a and 155b. Therefore, the left and right fixing rings 150a and 150b elastically come into contact with the support tubes 163a and 163b. Cam fixing pieces 165a and 165b are attached to upper and lower portions of the fixing plates 164a and 164b. In addition, operation cams 166a and 166b are rotatably respectively inserted in the cam fixing pieces 165a and 165b. The operation cams 166a and 166b push the operation rods 154a and 154b, in such a manner that the operation cams 166a and 166b cause the left and right fixing rings 150a and 150b to come into close contact with the movement roller 140 selectively. In addition, wires w3 and w4 are respectively connected to pivoting pieces 166-1a and 166-1b which are provided in the cam fixing pieces 165a and 165b.

The wire W3 operates the left operation cam 166a. An upper end of the wire W3 is connected to the switching member 170 and a lower end of the wire W3 is connected to the pivoting piece 166-1a of the left operation cam 166a. In this case, when the wire W3 is pulled through the switching member 170, the left operation cam 166a rotates and pushes the left operation rod 154a to the movement roller 140, in such a manner that the pad 151a comes into close contact with the movement roller 140, as illustrated in FIG. 9b. In contrast, when the wire W3 is released through the switching member 170, the left operation cam 166a and the left operation rod 154a return the original state, and thus the pad 151a of the left fixing ring 150a is separate from the movement roller 140.

The wire W4 operates the right operation cam 166b. An upper end of the wire W4 is connected to the switching member 170 and a lower end of the wire W4 is connected to the pivoting piece 166-1b of the right operation cam 166b. In this case, when the wire W4 is pulled through the switching member 170, the right operation cam 166b rotates and pushes the right operation rod 154b to the movement roller 140, in such a manner that the pad 151b comes into close contact with the movement roller 140, as illustrated in FIG. 9c. In contrast, when the wire W4 is released through the switching member 170, the right operation cam 166b and the left operation rod 154a return the original state, and thus the pad 151b of the right fixing ring 150b is separate from the movement roller 140.

Figure 11:
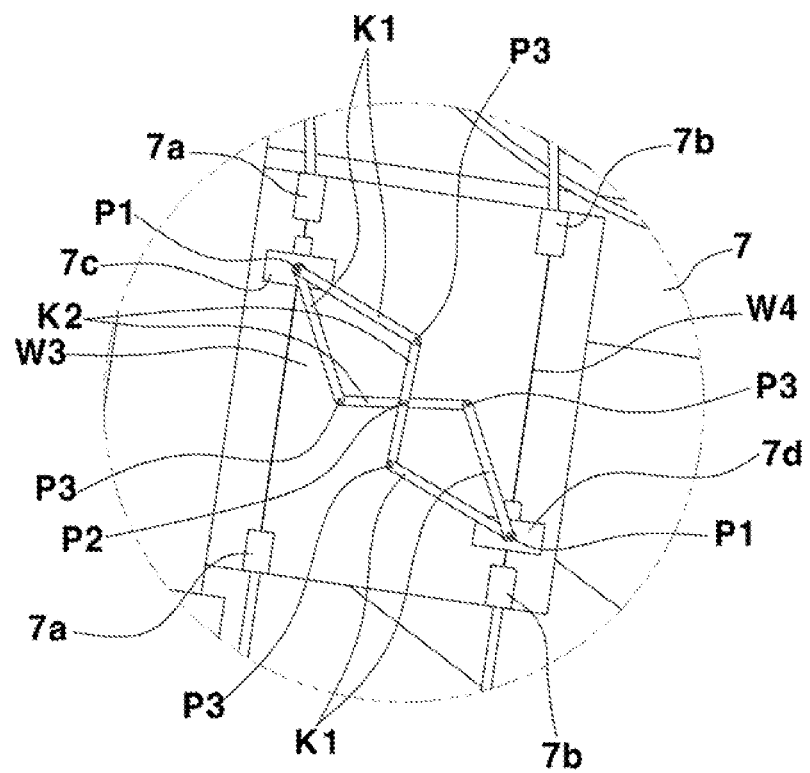

According to the present invention, a pair of restriction portions 7a and 7b which guide or restrict the movement of the wires W3 and w4 are provided in a frame 7 of the bicycle 1, as illustrated in FIG. 11. Furthermore, engagement portions 7c and 7d which engage with the restriction portions 7a and 7b are respectively provided in the wires W3 and w4. In this case, the engagement portions 7c and 7d are alternately operated in a portion between a pair of restriction portions 7a and 7b.

In addition, according to the present invention, one ends of a pair of first links K1 are connected to the engagement portion 7c or 7d through a shaft P1, as illustrated in FIG. 11. Furthermore, both ends of a pair of second links K2 which are fixed to the frame through a shaft P2 in a state where center portions of the second links K2 cross to each other are respectively connected to the other ends of the pair of first links K1 through shafts P3. In this case, when both the engagement portions 7c and 7d move upward or downward, the pair of first links K1 and the second links K2 move like a seesaw and allow the wires W3 and W4 to operate smoothly.

Figure 12:
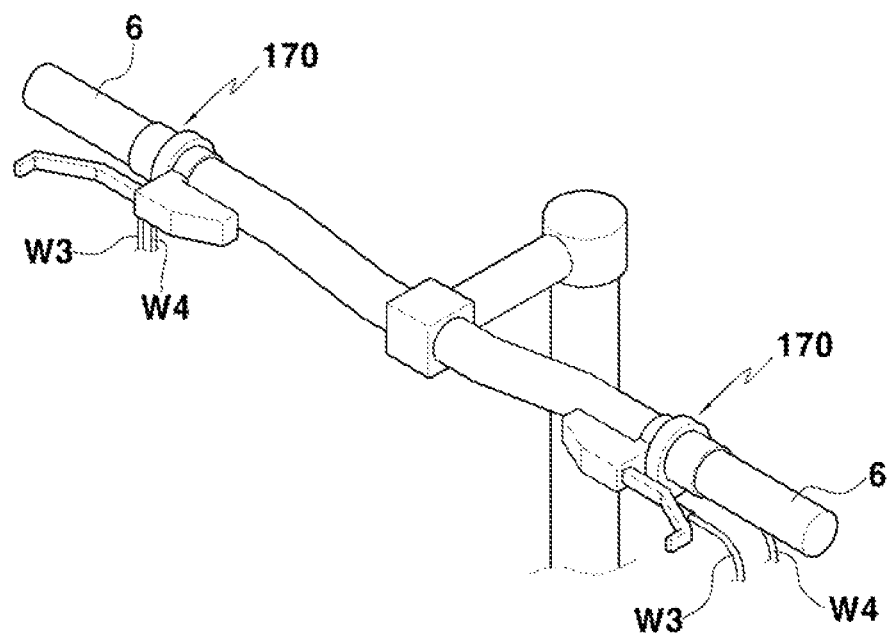

The switching members 170 are respectively installed in handles 6 on both sides of the bicycle 1, as illustrated in FIG. 12. A pair of both switching members 170 pull or release the wire W3 of the left operation members 160a and the wire W4 of the right operation members 160b which are disposed in the front and rear wheels 2 and 3. In this case, the switching member 170 installed in one side of the handle 6 operates both the wires W3 and w4 disposed in the front wheel 2 and the switching member 170 installed in the other side of the handle 6 operates both wires W3 and W4 disposed in the rear wheel 3.

The details of the whole operational relationship of the horse-riding bicycle according to the first embodiment of the present invention configured as described above will be explained below with reference to the appended drawings.

Figure 9A:
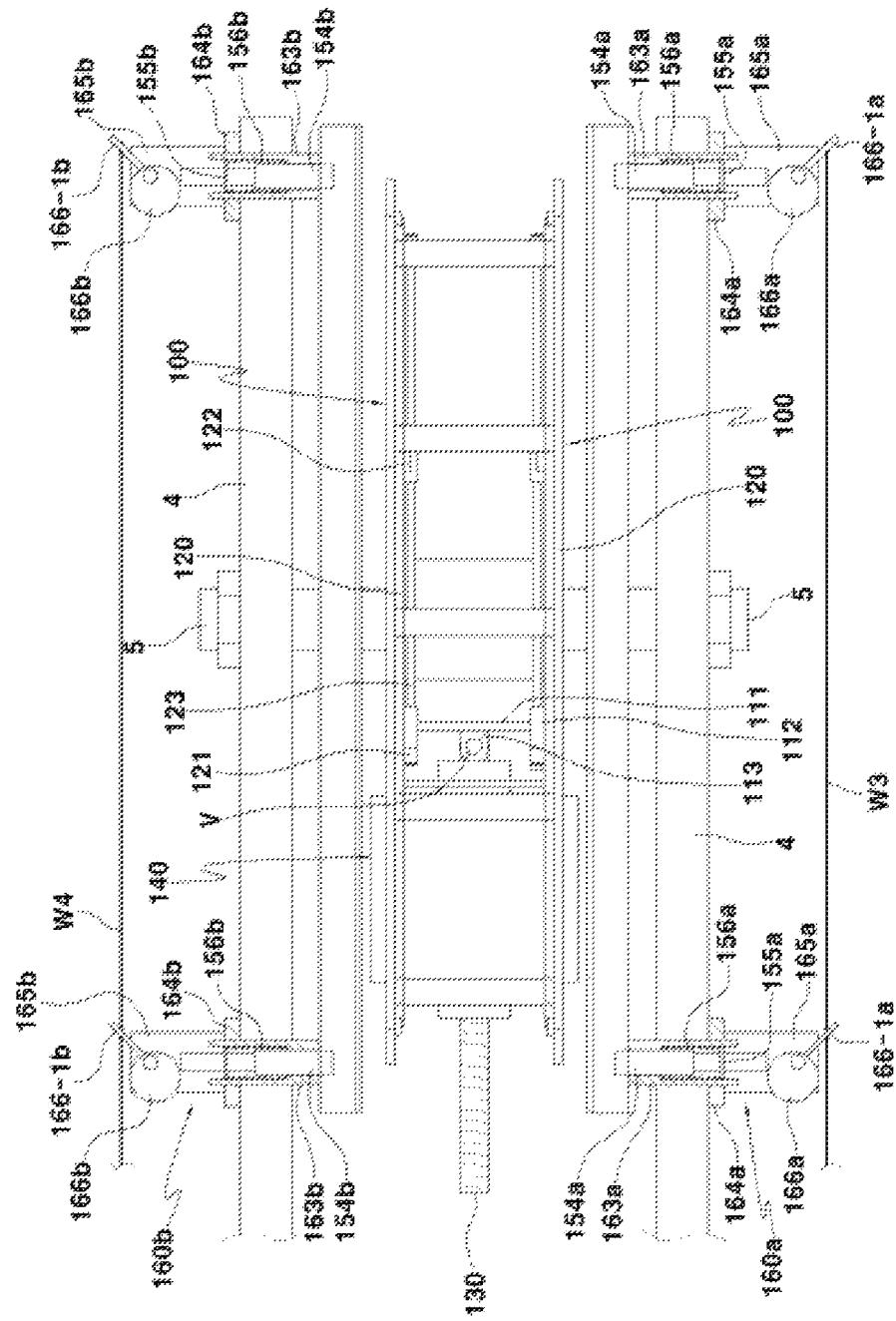
FIGS. 9a, 9b, and 9c are plan views illustrating an operation state of the left and right operation members according to the first embodiment of the present invention.
Figure 9B:
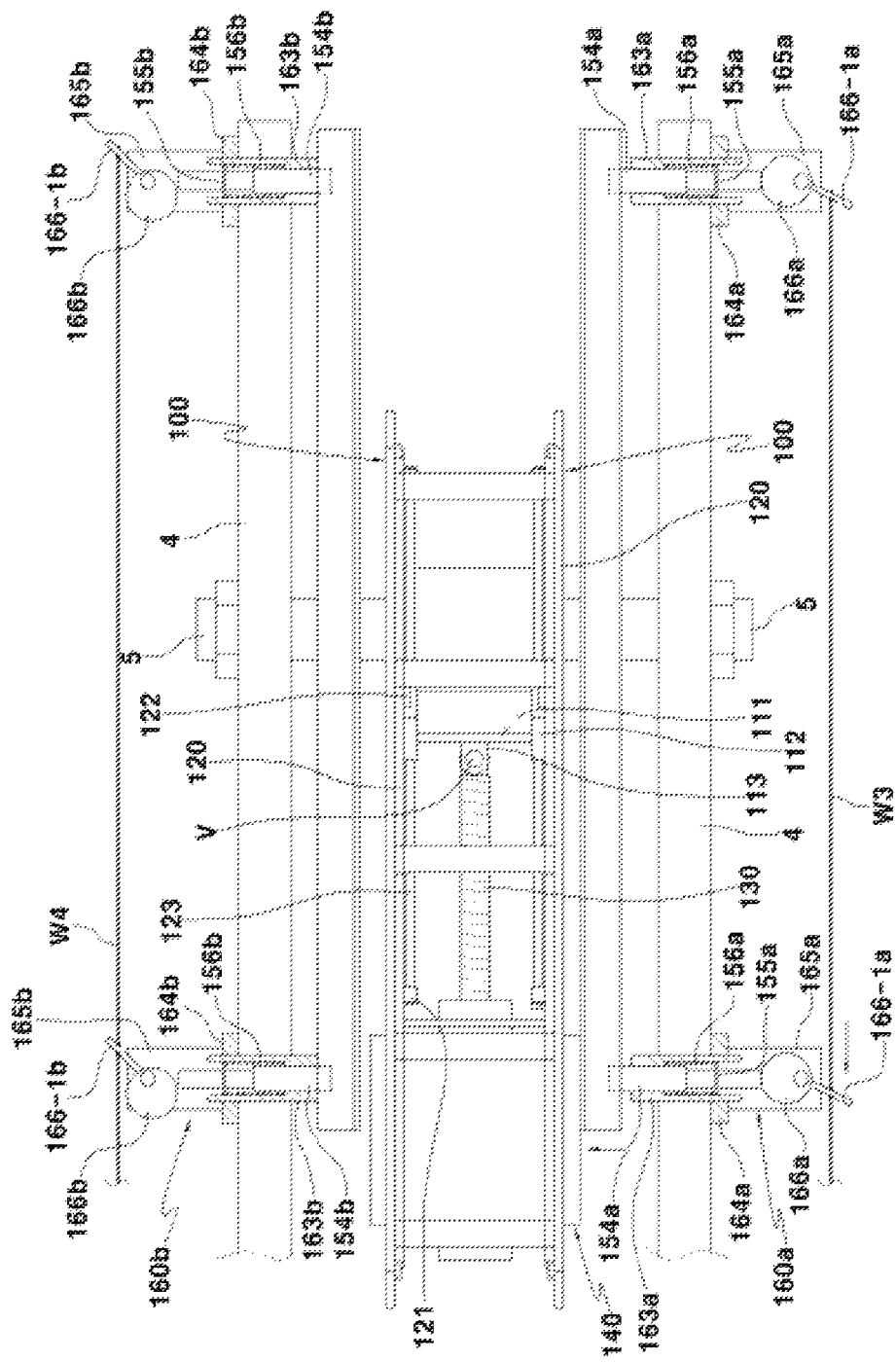
Figure 9C:
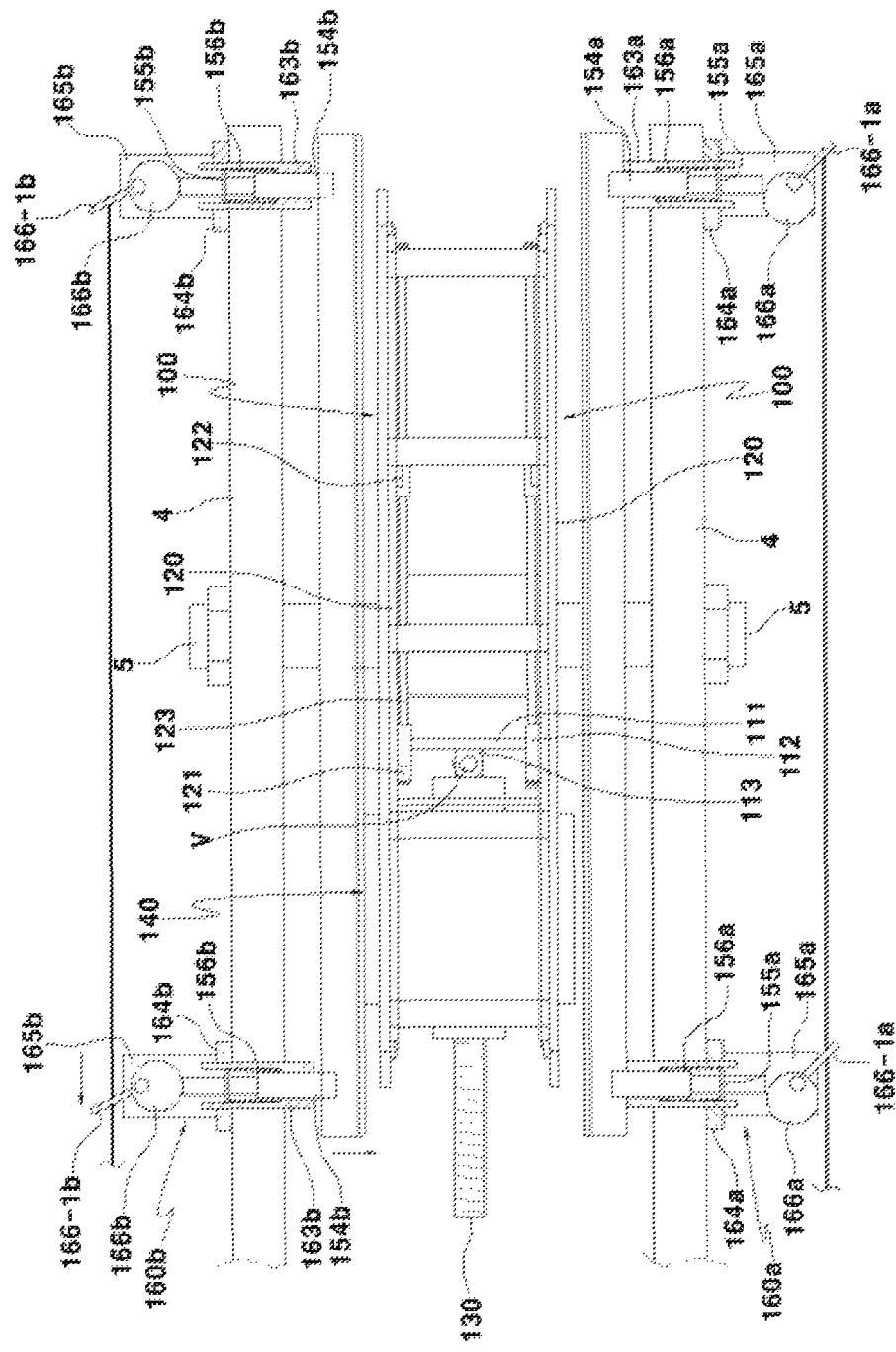
Figure 10A:
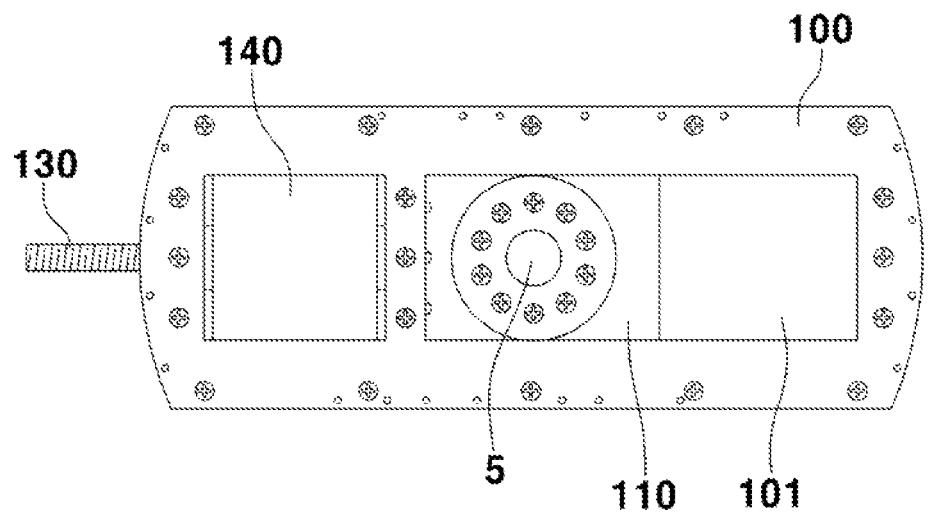
FIGS. 10a and 10b are side views illustrating a normal driving mode and a horse-riding driving mode according to the first embodiment of the present invention.

First, FIGS. 9a and 10a illustrate the normal driving mode state in which the hub 100 and the hub shaft 5 are concentrically disposed. In this state, the hub 100 maintains a concentric state in relation to the hub shaft 5. Furthermore, when the bicycle 1 is driven in this state, the left and right fixing rings 150a and 150b does not interfere with the movement roller 140 rotating with the hub 100. As a result, the hub 100 does not swing and rotates in a state where the hub 100 maintains the normal driving mode in concentric with the hub shaft 5.

In the normal driving mode, the movement roller 140 is separate from the pad 151a of the left fixing ring 150a and the pad 151b of the right fixing ring 150b, as illustrated in FIGS. 9a and 10a. As a result, during driving, the movement roller 140 is prevented from rotating arbitrary in the normal direction or the reverse direction at an original position.

Next, when a user switches a mode of the switching member 170 to the horse-riding driving mode in the normal driving mode so as to switch the driving mode to the horse-riding driving mode, the left operation member 160a pushes the left fixing ring 150a to the movement roller 140 through the wire W3 which is pulled as illustrated in FIG. 9b, in such a manner that the pad 151a comes into close contact with the movement roller 140.

Figure 10B:
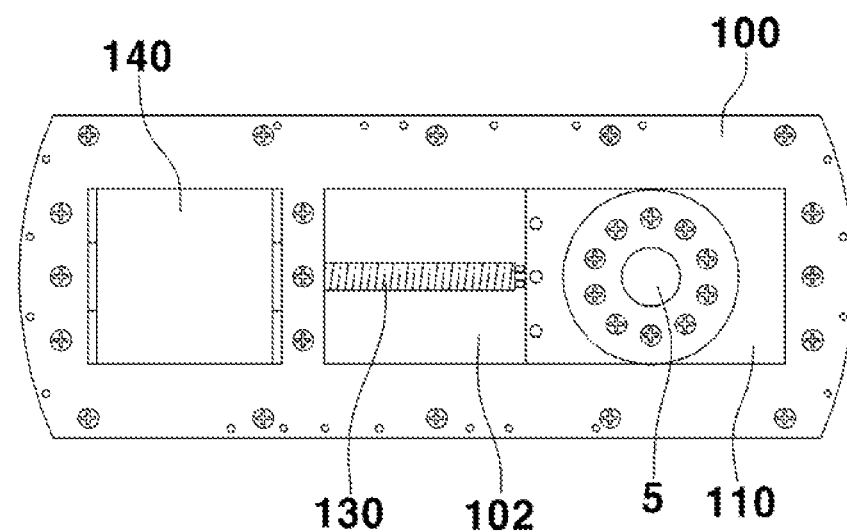

When the bicycle is driven in the state illustrated in FIG. 9b, the movement roller 140 rotating with the hub 100 rotates in a state where the movement roller 140 is in close contact with the pad 151a of the left fixing ring 150a, and thus the movement roller 140 rotates in a direction in which the movement roller 140 is released from the screw rod 130. In this case, the movement roller 140 rotates along with the pad 151a of the left fixing ring 150a, in a direction in which the movement roller 140 is released from the rod, and moves outward, as illustrated in FIGS. 9b and 10b. At this time, the hub 100 also moves outward along with the support plate 110.

Therefore, the hub 100 is eccentric with respect to the hub shaft 5, as illustrated in FIGS. 9b and 10b. As a result, the horse-riding driving mode in which the bicycle swings during driving is maintained. After the driving mode is switched to the horse-riding driving mode, as described above, the wire W3 in a pulled state is released through the switching member 170, in such a manner that the pad 151a of the left fixing ring 150a is separate from the movement roller 140. In this case, during driving, a user can appropriately adjust a movement (eccentric) distance of the hub 100 through the switching member 170. In other words, a user pulls the wire W3 through the switching member 170 until the hub 100 moves completely outward and allows the movement roller 140 to rotate. When a user releases the wire W3 through the switching member 170 before the hub 100 moves completely outward, the pad 151a of the left fixing ring 150a is separate from the movement roller 140. Therefore, the rotation of the movement roller 140 is stopped and the hub 100 is prevented from moving further outward. As a result, the movement distance of the hub 100 is adjusted during the horse-riding driving mode.

When a user switches the mode of the switching member 170 to the normal driving mode during the horse-riding driving mode so as to switch the driving mode to the normal driving mode, the right operation member 160b pushes the right fixing ring 150b to the movement roller 140 through the wire W4 which is pilled as illustrated in FIG. 9c, in such a manner that the pad 151b comes into close contact with the movement roller 140.

When the bicycle is driven in the state illustrated in FIG. 9c, the movement roller 140 rotating with the hub 100 rotates in a state where the movement roller 140 is in close contact with the pad 151b of the right fixing ring 150b, and thus the movement roller 140 rotates in a direction in which the movement roller 140 is tightened with respect to the screw rod 130. In this case, the movement roller 140 rotates along with the pad 151b of the right fixing ring 150b, in a direction in which the movement roller 140 is tightened with respect to the rod, and moves inward, as illustrated in FIGS. 7c, 10c, and 11a. At this time, the hub 100 also moves inward along the support plate 110.

Therefore, the hub 100 is concentric with the hub shaft 5, as illustrated in FIGS. 9c and 10a. As a result, the normal driving mode in which the bicycle does not swing during driving is maintained. After the driving mode is switched to the normal driving mode, as described above, the wire W4 in a pulled state is released through the switching member 170, in such a manner that the pad 151b of the right fixing ring 150b is separate from the movement roller 140.

The basic feature of a technical configuration of a horse-riding bicycle according to a second embodiment of the present invention is as follows. As illustrated in FIGS. 13 to 22, the horse-riding bicycle according to the second embodiment of the present invention includes: a pair of hubs 200 which are installed in each of the front and rear wheels 2 and 3 of the bicycle 1, the pair of hubs 200 including guide holes 201 having a rectangular shape and a nut 202 which is connected to one sides of the hubs 200 and in which a female screw 202a is formed; a pair of support plates 210 which are movably assembled inside the guide hole 201 of the hub 200, support the hub shaft 5 connected to the fork 4 and include a connection plate 211 which is connected to one sides of the support plates 210 and in which a shaft hole 211a is formed; guide plates 220 which are respectively attached to inner upper and lower portions of the hub 200 and guide movement of the hub 200; a motor 230 which includes a shaft 231 which is inserted into the shaft hole 211a and is fixed to an inner side of the connection plate 211; a screw rod 240 which is thread-joined to a female screw 202a of the nut 202 in a state where the screw rod 240 is fixed to the shaft 231 of the motor 230; a battery 250 which is installed in a frame 7 of the bicycle 1; a slip ring 260 which is installed in the hub shaft 5 and allows the motor 230 to be electrically connected to the battery 250; and a pair of operation members 270 which are installed in the handles 6 on both sides of the bicycle 1 and allow the motor 230 to be driven in the normal direction or the reverse direction.

Figure 14:
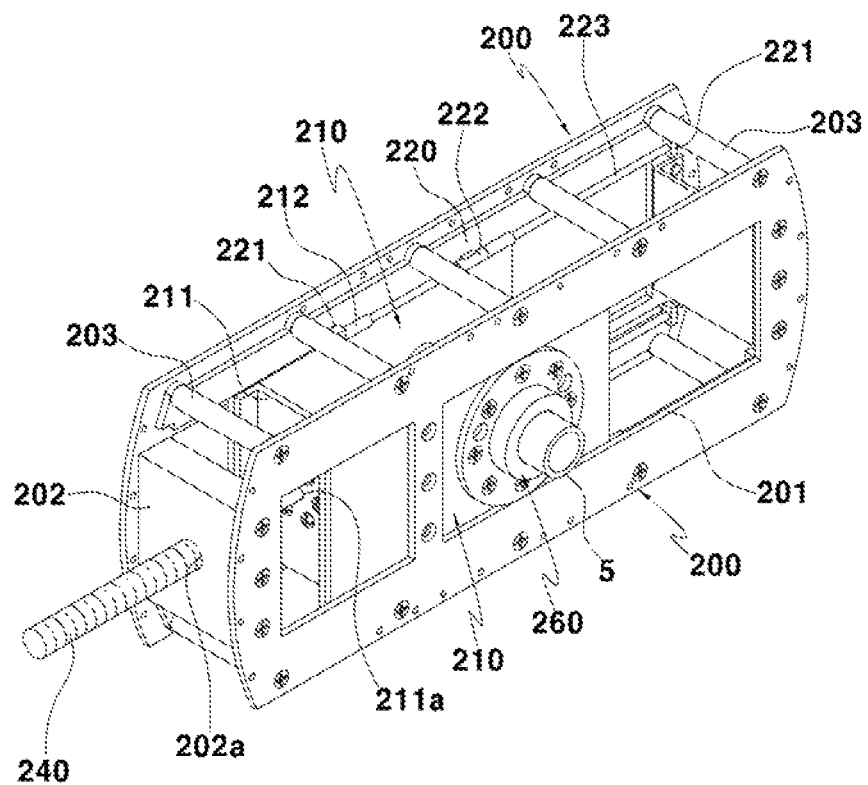

In this case, the hubs 200 are formed to have a rectangular shape. The hubs 200 are installed in both sides of the center portions of the front wheel 2 and the rear wheel 3 of the bicycle 1. The guide holes 201 having a rectangular shape are respectively formed in the pair of both hubs 200. In addition, the nut 202 having the female screw 202a formed therein is connected to one sides of the pair of both hubs 200. In this case, a plurality of spacing rods (203) are connected to both the hubs 200 and the guide plates 220 by fastening screws or the likes, as illustrated in FIG. 14.

The support plate 210 is formed to have a rectangular shape and is movably assembled inside the guide holes 201 of both the hubs 200 which are disposed in the front and rear wheels 2 and 3. The pair of both support plates 210 rotatably support front and rear hub shafts 5 which are connected to the front and rear forks 4. The connection plate 211 having the shaft hole 211a formed therein is connected to one sides of the pair of both support plates 210.

The guide plates 220 are respectively attached to the inner upper and lower portions of the hub 200. Both the guide plates 220 in the upper and lower portions guide the movement of the hub 200. In this case, both the upper and lower guide plates 220 are attached to the hub 200 by screwing, welding, or the like. A pair of both support plates 210 are disposed in a portion between the upper guide plate 220 and the lower guide plate 220.

Figure 15:
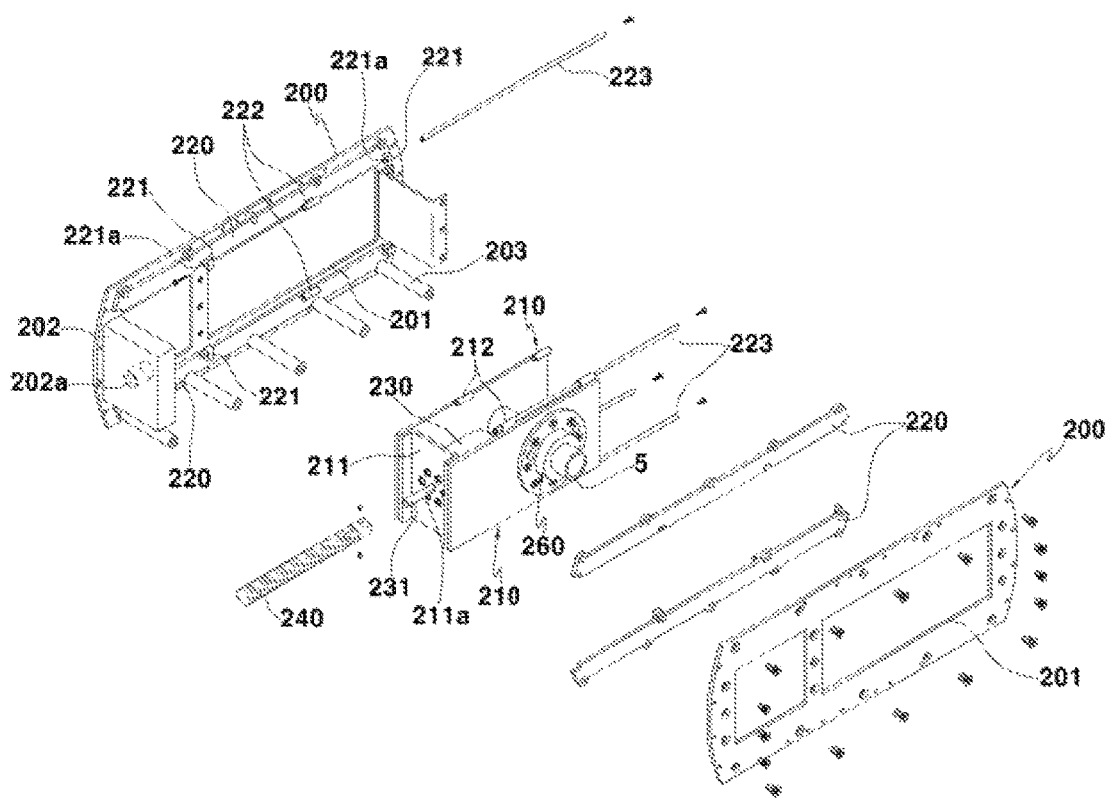
Figure 16:
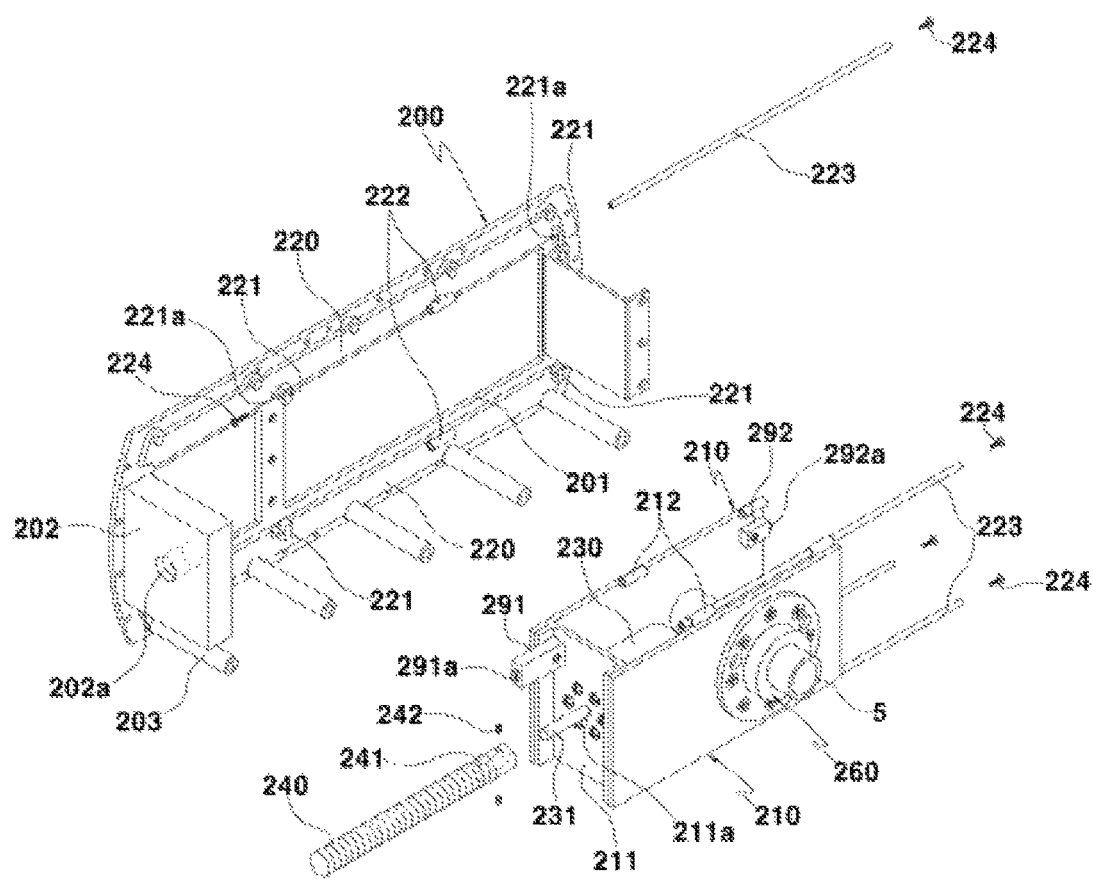

According to the present invention, fixing pieces 221 in which screw holes 221a are formed are attached to each of the guide plates 220 on both sides of the guide hole 201, as illustrated in FIGS. 15 and 16. Furthermore, in a center portion between both the fixing pieces 221, a movement tube 222 is attached to the guide plate 220. Both ends of a guide rod 223 are fixed to screw holes 221a of both the fixing pieces 221 by fastening a screw 224, in a state where the guide rod 223 is inserted into the movement tube 222. In addition, support tubes 212 into which the guide rods 223 are inserted and which movably support the guide rods 223 are attached to upper and lower portions on one side of the support plate 210.

The motor 230 is disposed inside the connection plate 211 of the support plate 210 and integrally fixed to the connection plate 211 by fastening a plurality of screws. The shaft 231 of the motor 230 is inserted into the shaft hole 211a of the connection plate 211 and protrudes toward the nut 202. The screw rod 240 is integrally fixed to the shaft 231 of the motor 230. In this case, the motor 230 causes the screw rod 240 to be driven in the normal direction or the reverse direction.

In the motor 230, one end is integrally fixed to the shaft 231 of the motor 230. The screw rod 240 extends over a center portion of the nut 202 provided in the hub 200. In this case, the screw rod 240 is screwed with the female screw 202a of the nut 202 and moves the hub 200. In other words, the screw rod 240 rotates in the normal direction or the reverse direction and moves the hub 200 to the normal driving mode position or the horse-riding driving mode position.

Figure 17:
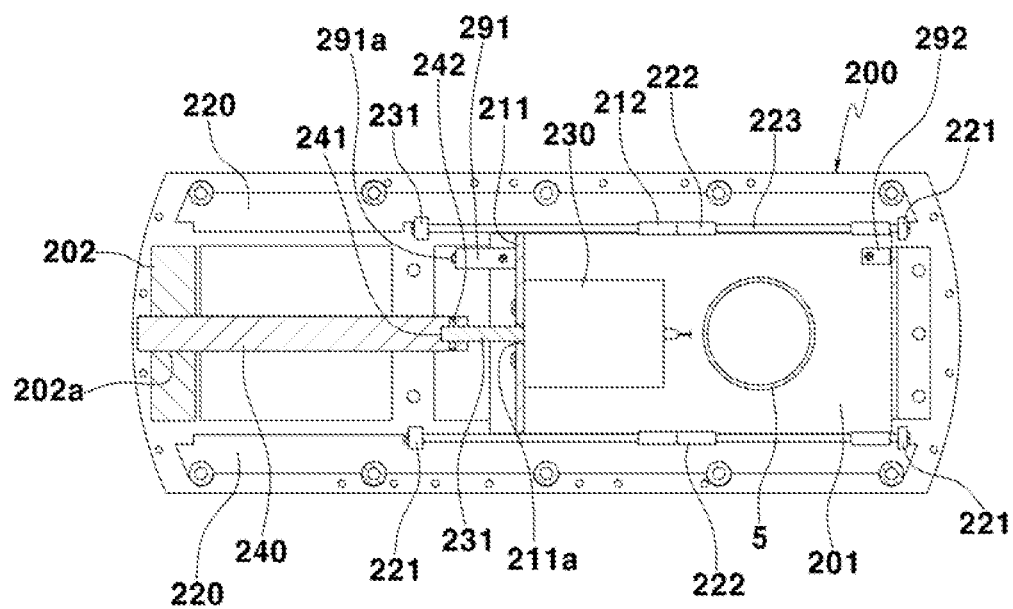

According to the present invention, a shaft groove 241 into which the shaft 231 of the motor 230 is inserted is formed in the screw rod 240, as illustrated in FIGS. 16 and 17. In addition, a headless bolt 242 which fixes the shaft 231 of the motor 230, which is inserted into the shaft groove 241, is provided in the motor 230.

When a rotation force is applied to the screw rod 240 in the normal direction or the reverse direction, the guide hole 201 of the hub 200 smoothly moves along the support plate 210 toward the inner side or the outer side by tightening or releasing of the nut 202 which is thread-joined to the screw rod 240. As a result, the hub 200 can maintain the concentric state or the eccentric state in relation to the hub shaft 5. In this case, the screw rod 240 maintains a fixed state in relation to the support plate 210 and the nut 202 is assembled in a state where the nut 202 is fixed to the hub 200 and thread-joined to the screw rod 240 and thus, when the screw rod 240 is rotated in the normal direction or the reverse direction, the nut 202 moves in a direction directed to the hub shaft 5 or an opposite direction by the screw rod 240. As a result, the hub 200 moves along with the nut 202.

Figure 13:
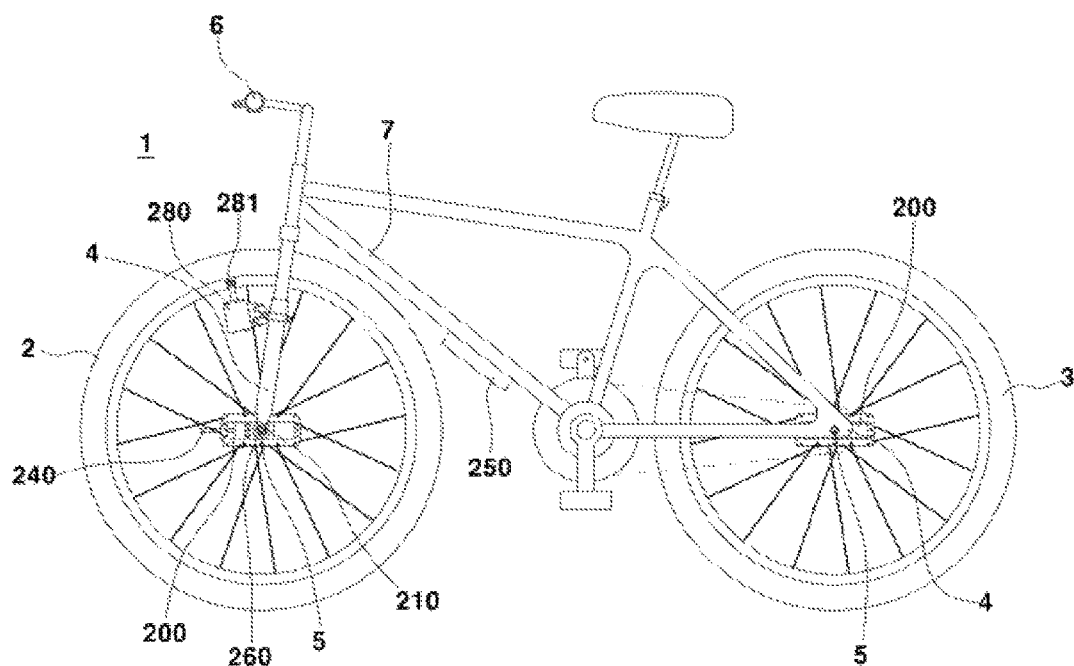

The battery 250 is installed in the frame 7 of the bicycle 1, as illustrated in FIG. 13. The battery 250 supplies electric power to the motor 230. In this case, the battery 250 is electrically connected to the motor 230 and the operation member 270.

The slip ring 260 is installed in the hub shaft 5. The slip ring 260 electrically connects the motor 230 and the battery 250. In this case, during driving of the bicycle 1, the slip ring 260 and support plate 210 supply electric power from the battery 250 to the motor 230 in a rotating state without tangling of wires.

Figure 18:
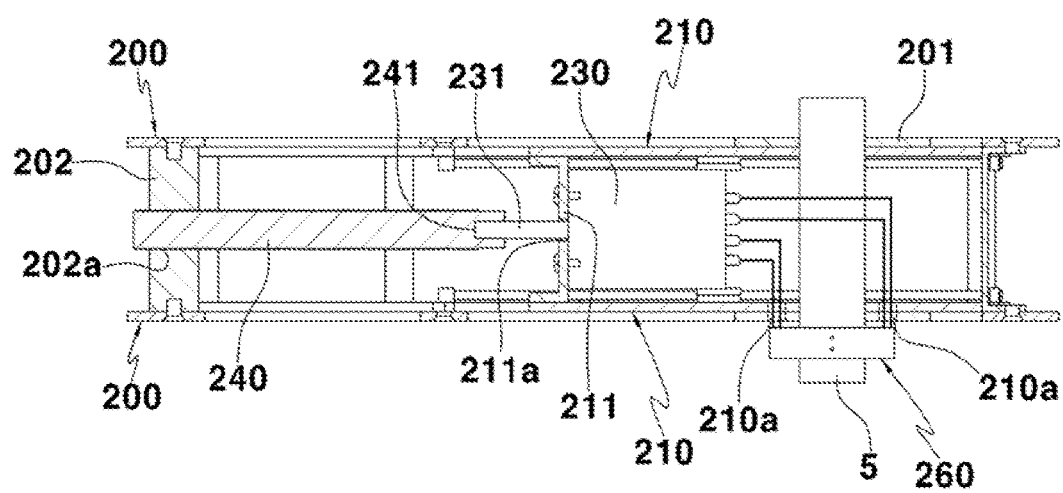

According to the present invention, the slip ring 260 include first and second rotation rings 261 and 262 and first and second terminals 264 and 265, as illustrated in FIGS. 17, 18, 20a, and 20b. The first and second rotation rings 261 and 262 are installed in an insulation ring 5a which is thread-joined to the hub shaft 5 in a state where the first and second rotation rings 261 and 262 are separate from each other. Further, the first and second rotation rings 261 and 262 are connected to the motor 230 through wires. The first and second terminals 264 and 265 are embedded in a stator 263 so as to be connected to the first and second rotation rings 261 and 262 respectively. The first and second terminals 264 and 265 are connected to the battery 250 through wires. In this case, a female thread is formed in an inner periphery of the insulation ring 5a and a male thread which is thread-assembled to the female thread of the insulation ring 5a is formed in an outer periphery of the hub shaft 5. The stator 263 is integrally fixed to the fork 4 of the bicycle 1. In addition, a hole 210a through which wires are taken out is formed in the support plate 210, as illustrated in FIG. 18.

Figure 20A:
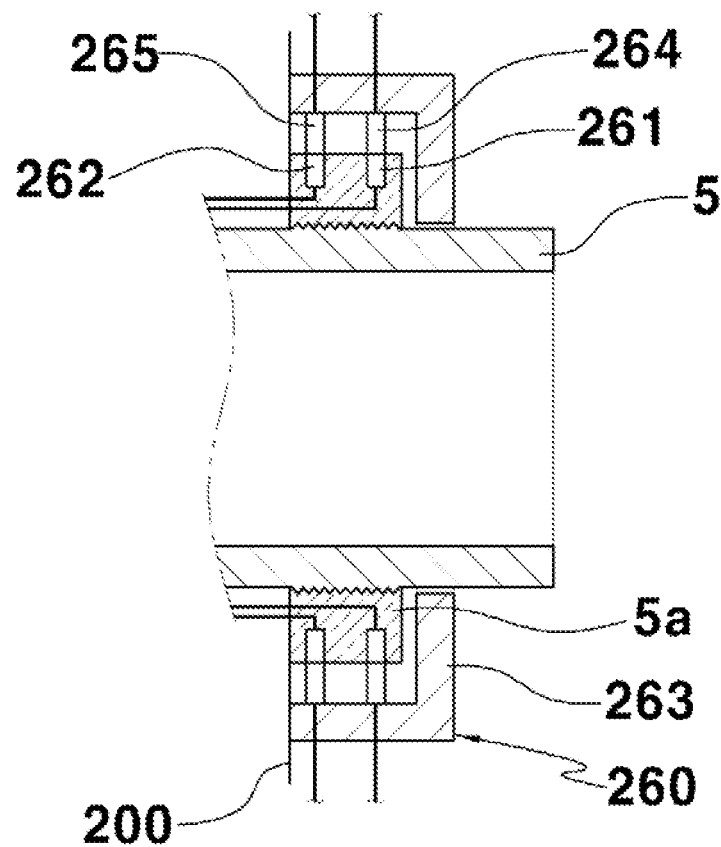
FIGS. 20a and 20b are respectively a front cross-sectional view and a lateral cross-sectional view of a slip ring according to the second embodiment of the present invention.
Figure 20B:
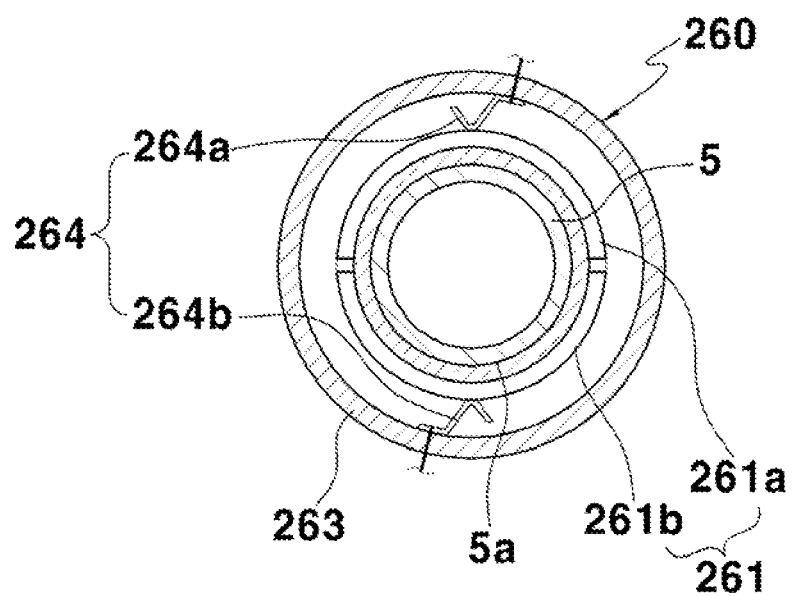
Figure 21A:
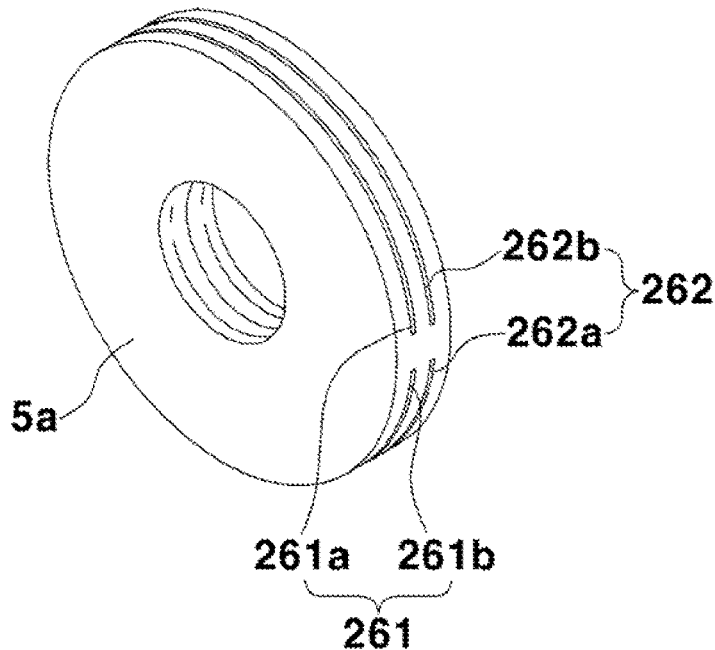
FIG. 21a is a perspective view of an insulation ring according to the second embodiment of the present invention.
Figure 21B:
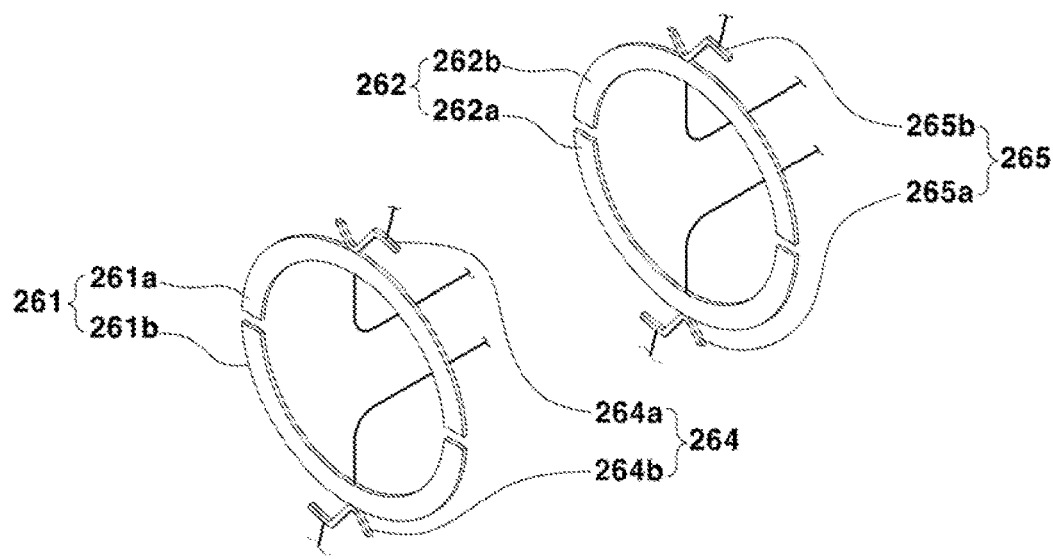
FIG. 21b is a perspective view of first and second rotation rings of the slip ring according to the second embodiment of the present invention.
Figure 22:
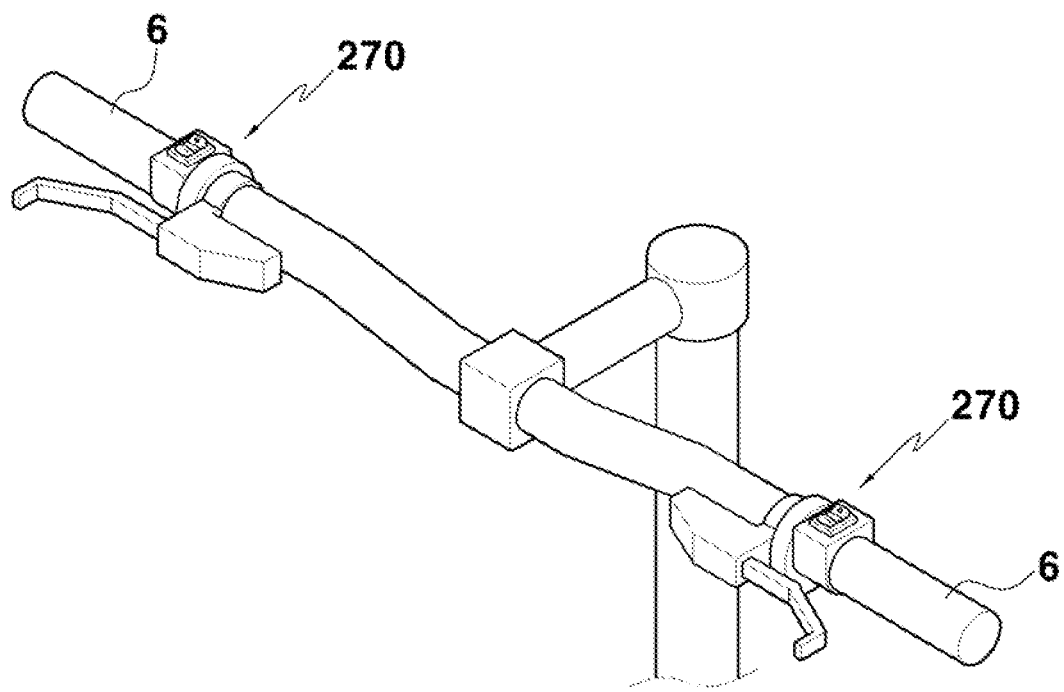

According to the present invention, the first and second rotation rings 261 and 262 are constituted of anode rings 261a and 262a and cathode rings 261b and 262b which are formed to have a semicircular shape and respectively connected to the motor 230 through wires, as illustrated in FIGS. 20a, 21b, 21a, and 21b. The first and second terminals 264 and 265 include anode terminals 264a and 265a and cathode terminals 264b and 265b which correspond to the anode rings 261a and 262a and the cathode rings 261b and 262b. In this case, when the motor 230 is driven in the normal direction, electric power is only supplied to the anode terminal 264a and the cathode terminal 265b which receive load. When the motor 230 is operated in the reverse direction, electric power is only supplied to the cathode terminal 264b and the anode terminal 265a which receive load.

It should be understood that the first and second rotation rings 261 and 262 may not be separate from each other so as to be formed to have a semicircular shape, as described above, and formed to have a circular shape and, further, the first rotation ring 261 may constitute an anode ring (or a cathode ring) and the second rotation ring 262 may constitute a cathode ring (or an anode ring).

The operation members 270 are installed in the handles 6 on both sides of the bicycle 1. A pair of both operation members 270 performs a switching operation for driving, in the normal direction or the reverse direction, the motors 230 which are respectively installed in the front and rear wheels 2 and 3. In this case, the operation member 270 installed in one side of the handle 6 drives, in the normal direction or the reverse direction, the motor 230 disposed in the front wheel 2 and the operation member 270 installed on the other side of the handle 6 drives, in the normal direction or the reverse direction, the motor 230 disposed in the rear wheel 3.

According to the present invention, a generator 280 which charges the battery 250 is installed in the frame 7 of the bicycle 1, as illustrated in FIG. 13. In this case, a rotor 281 which comes into contact with the wheel of the bicycle 1 is provided in the generator 280 and a charger is provided in the battery 250. The generator 280 and the charger of the battery 250 are electrically connected.

Figure 19A:
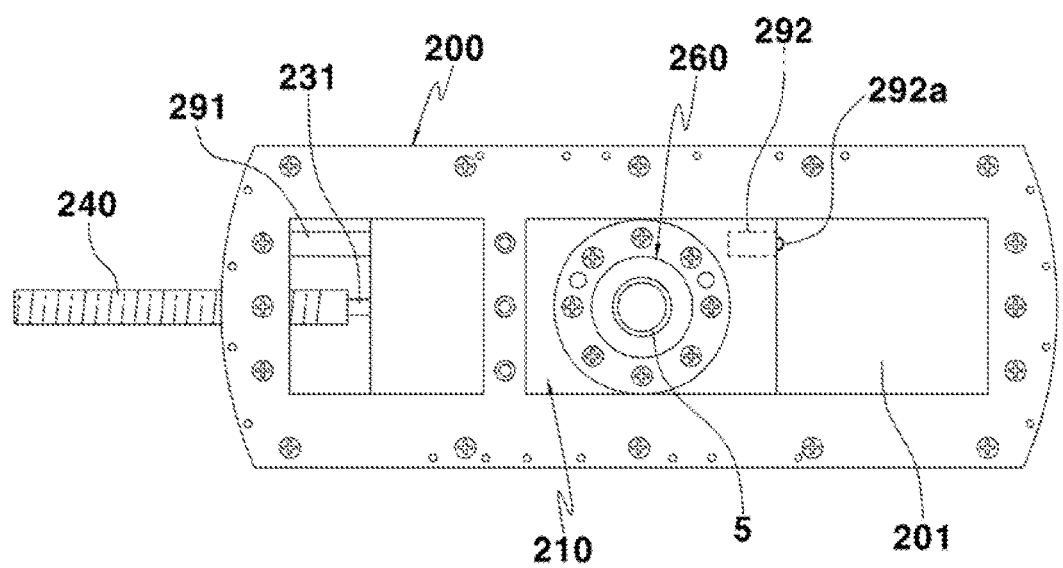
FIGS. 19a and 19b are side views illustrating a normal driving mode and a horse-riding driving mode according to the second embodiment of the present invention.
Figure 19B:
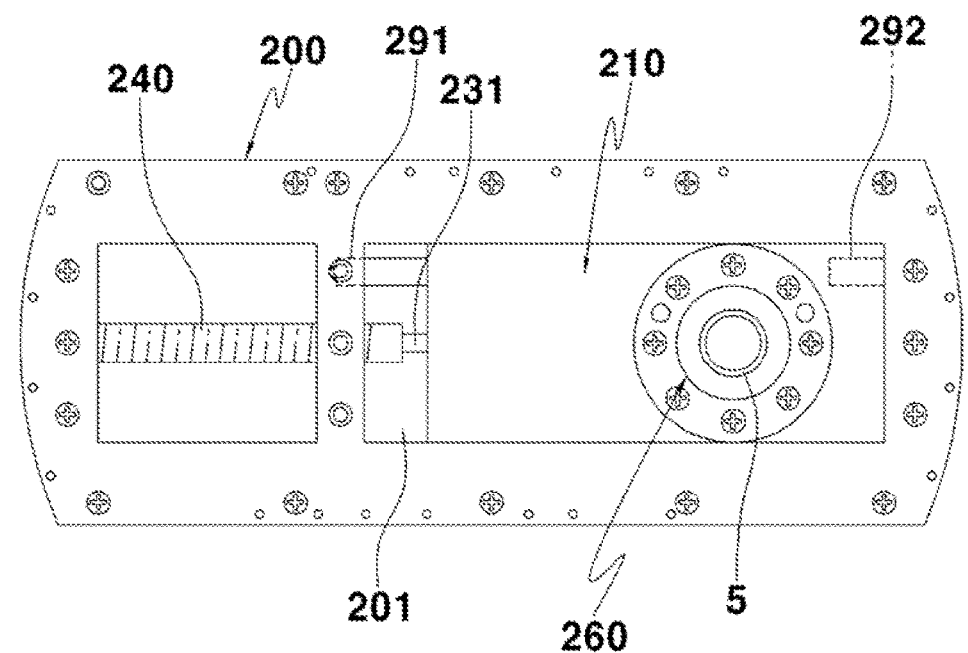

First and second limit switches 291 and 292 are respectively installed in both sides of the support plate 210, as illustrated in FIGS. 16, 19a, and 19b.

The details of the whole operational relationship of the horse-riding bicycle according to the second embodiment of the present invention configured as described above will be explained below with reference to the appended drawings.

First, FIG. 19a illustrates the normal driving mode state in which the hub 200 and the hub shaft 5 are concentrically disposed. In this state, the hub 200 maintains a concentric state in relation to the hub shaft 5. Furthermore, when the bicycle 1 is driven in this state, the motor 230 which rotates with the hub 200 is not driven. As a result, the hub 200 does not swing and rotates in a state where the hub 200 maintains the normal driving mode in concentric with the hub shaft 5.

Next, when a user switches a mode of the switching member 270 to the horse-riding driving mode in the normal driving mode so as to switch the driving mode to the horse-riding driving mode, the shaft 231 of the motor 230 is driven in the reverse direction in which the nut 202 moves outward. In this case, the nut 202 moves outward, as illustrated in FIG. 19b. At this time, the hub 200 also moves outward along with the support plate 210.

Therefore, the hub 200 is eccentric with respect to the hub shaft 5, as illustrated in FIG. 19b. As a result, the horse-riding driving mode in which the bicycle swing during driving is maintained. After the driving mode is completely switched to the horse-riding driving mode, as described above, a terminal 292a of the second limit switch 292 comes into contact with the hub 200 and driving of the motor 230 is stopped. In this case, during driving, a user can appropriately adjust a movement (eccentric) distance of the hub 200 through the switching member 270. In other words, the motor 230 can be driven by the operation member 270 until the hub 200 moves completely outward. When driving of the motor 230 is stopped by the operation member 270 before the hub 200 moves completely outward, the movement of the nut 202 is stopped, and thus the hub 200 is prevented from moving further outward. As a result, the movement distance of the hub 200 is adjusted during the horse-riding driving mode.

When a user switches the mode of the switching member 270 to the normal driving mode during the horse-riding driving mode so as to switch the driving mode to the normal driving mode, the shaft 231 of the motor 230 is driven in the normal direction in which the nut 202 moves inward. In this case, the nut 202 moves inward, as illustrated in FIG. 19a. At this time, the hub 200 also moves inward along with the support plate 210.

Therefore, the hub 200 is concentric with the hub shaft 5, as illustrated in FIG. 19a. As a result, the normal driving mode in which the bicycle does not swing during driving is maintained. After the driving mode is completely switched to the normal driving mode, as described above, a terminal 291a of the first limit switch 291 comes into contact with the hub 200 and driving of the motor 230 is stopped.

Therefore, according to the present invention, both normal driving and horse-riding driving can be performed by moving the hub 100 or 200 to a position concentric or eccentric with respect to the hub shaft 5. As a result, a swinging movement similar to horse riding is achieved in cycling, and thus there is an advantage in that a horse-riding effect which is exciting and can provide a total-body workout can be obtained from simple cycling.

In addition, the present invention has an advantage in that a user can simply switch the driving mode between the normal driving mode and the horse-riding driving mode using the switching member 170 or the operation member 270.

Furthermore, the present invention has an advantage in that a reduction in the cost is achieved and a switching operation between the normal driving mode and the horse-riding driving mode is smoothly performed because the structure of the horse-riding driving mode in which the hub 100 or 200 is moved is simple.

Additionally, in the present invention, the normal driving mode or the horse-riding driving mode can be selectively applied to the front wheel 2 and the rear wheel 3. Thus, only the front wheel 2 can be driven in the horse-riding driving mode while the rear wheel 3 is driven in the normal driving mode. In contrast, only the rear wheel 3 can be driven in the horse-riding driving mode while the front wheel 2 is driven in the normal driving mode. Furthermore, both the front wheel 2 and the rear wheel 3 are driven in the horse-riding driving mode. As a result, the present invention has an advantage in that horse-riding effects different from each other can be obtained.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 100: hub | 101: guide hole |
| 102: roller hole | 103: first connection plate |
| 103a: shaft hole | 104: second connection plate |
| 104a: shaft hole | 110: support plate |
| 111: connection plate | 120: guide plate |
| 130: screw rod | 140: movement roller |
| 150a: left fixing ring | 151a: pad |
| 150b: right fixing ring | 151b: pad |
| 160a: left operation member | 160b: right operation member |
| 170: switching member | 200: hub |
| 201: guide hole | 202: nut |
| 202a: female screw | 210: support plate |
| 211: connection plate | 211a: shaft hole |
| 220: guide plate | 230: motor |
| 231: shaft | 240: screw rod |
| 250: battery | 260: slip ring |
| 270: operation member | |

What is claimed is:
1. A horse-riding bicycle comprising:
a pair of hubs which are installed in each of front and rear wheels of the bicycle, the pair of hubs including guide holes having a rectangular shape and a nut which is connected to one side of the hubs and in which a female screw is formed;
a pair of support plates which are movably assembled inside the guide hole of the hub, support a hub shaft connected to a fork and include a connection plate which is connected to one side of the pair of support plates and in which a shaft hole is formed;

guide plates which are respectively attached to inner upper and lower portions of the hub and guide movement of the hub;
a motor which includes a shaft which is inserted into the shaft hole and is fixed to an inner side of the connection plate;
a screw rod which is thread-joined to a female screw of the nut in a state where the screw rod is fixed to the shaft of the motor;
a battery which is installed in a frame of the bicycle;
a slip ring which is installed in the hub shaft and allows the motor to be electrically connected to the battery; and
a pair of operation members which are installed in handles on both sides of the bicycle and allow the motor to be driven in a normal direction or a reverse direction.

2. The horse-riding bicycle of claim 1, wherein the slip ring comprises:
first and second rotation rings which are installed in an insulation ring which is thread-joined to the hub shaft in a state where the first and second rotation rings are separate from each other, and are connected to the motor through wires; and
first and second terminals which are embedded in a stator so as to be connected to the first and second rotation rings respectively and are connected to the battery,
the first and second rotation rings are constituted of anode rings and cathode rings which are formed to have a semicircular shape and are connected to the motor through wires, and
the first and second terminals are constituted of anode terminals and cathode terminals which correspond to the anode rings and the cathode rings and are connected to the battery through wires.

\* \* \* \* \*